United States Patent [19]
Yun et al.

[11] Patent Number: 5,433,864
[45] Date of Patent: Jul. 18, 1995

[54] METHOD FOR TREATING HEAVY METAL CONTAINING WASTE WATER BY UTILIZATION OF ACORN

[75] Inventors: Myung-Whan Yun; Jang-Jin Park; Yun-Whan Lee; In-Soon Chang, all of Daejeon-Si; Jae-In Sin, Seoul, all of Rep. of Korea

[73] Assignee: Korea Atomic Energy Research Institute, Daejeon-Si, Rep. of Korea

[21] Appl. No.: 241,071

[22] Filed: May 11, 1994

[30] Foreign Application Priority Data

Aug. 10, 1993 [KR] Rep. of Korea .................... 93-15484

[51] Int. Cl.$^6$ .............................................. C02F 1/62
[52] U.S. Cl. .................................. 210/725; 210/727; 210/730; 210/912
[58] Field of Search ............... 210/912, 724, 725, 726, 210/727, 728, 730

[56] References Cited

U.S. PATENT DOCUMENTS 4,871,518 10/1989 Yoon et al. ........................ 423/11

Primary Examiner—Neil McCarthy
Attorney, Agent, or Firm—Armstrong, Westerman, Hattori, McLeland & Naughton

[57] ABSTRACT

The invention discloses a method for treating a heavy metal containing waste water by using acorns. Acorns and nuts of other trees belonging to the Eagaceae group are dried at the room temperature and under the sun beams. Then acornic acid is extracted from the dried acorns. Then the acornic acid is filtered until it becomes colorless. A heavy metal containing waste water (low concentration and high concentration) is maintained at pH=8−11.5 by adding $NH_4OH$, $Ca(OH)_2$ and NAOH. Then the acornic acid is added into the waste water, and then, $Ca^{++}$ ions singly or together with other divalent cations are added by 50 ppm. Then this solution is agitated for several minutes, and then, the heavy metals are precipitated, or the solution is filtered, thereby treating the heavy metal containing waste water.

2 Claims, No Drawings

METHOD FOR TREATING HEAVY METAL CONTAINING WASTE WATER BY UTILIZATION OF ACORN

FIELD OF THE INVENTION

The present invention relates to a method for treating a heavy metal containing waste water through utilization of acorn. The present invention is based on the principles of Korean Patent No. 35740 (the corresponding foreign patents being U.S. Pat. No. 4,871,518, French Patent 2,621,034, German Patent 3,744,544, and a pending Japanese patent application).

BACKGROUND OF THE INVENTION

A heavy metal containing waste water refers to industrial waste water and urban sewage water which contain iron, copper, zinc, mercury, lead, cadmium, chrome, arsenic, aluminum and the like.

The conventional waste water treating method is such that metals are treated as hydrates in accordance with the solubility under the optimum pH state. However, if various metals exist in a mixed form within the waste water, they cannot be simply treated. Therefore, there is required a method which is capable of treating all the metals at the same time.

SUMMARY OF THE INVENTION

The present invention is intended to overcome a waste water treating method which is quite different from the conventional methods.

Therefore it is the object of the present invention to provide a method for treating a heavy metal containing waste water with acornic acid (the acornic acid was named first by the present inventor). The acornic acid is extracted from the nuts of oak tree.

The present invention provides a method for treating waste water, which is different from the conventional methods in its conception. The present invention uses acornic acid which is extracted from the nuts of oak tree. Or the present invention uses gallic acid and digallic acid which are the basic structures of the acornic acid. The derivatives of the acids are made to react with divalent cations such as calcium ions so as to form calcium acornate. The calcium acornate is condensed with heavy metals, so that they should be coprecipitated.

In measuring the treatment efficiency of the present invention, a test sample which is taken in the actual industrial site is used. As the heavy metal measuring instrument, ICP-MS (inductively coupled plasma—mass spectroscopy or graphite type A.A (atomic absorption spectroscopy) was used to measure the residue heavy metal concentrations of the supernatant.

Further, the waste water was coprecipitated by using derivatives of acorn, and thus, high concentration or low concentration heavy metal containing waste water was treated to such a degree that it was treated to (better than) the standard of the environmentally acceptable water.

Acorn is the nut of oak tree (*Quercus Dentata*) which flourishes in Korea, Japan, China and machurea. Acorn which is used in the present invention belongs to the Eagaceae group which includes the following trees.

1. *Quercus Dentata.*
2. *Quercus Acutissima.*
3. *Quercus Variabilis.*
4. *Quercus Myrsinaefolia.*
5. *Quercus Mongolica.*
6. *Quercus Crispula.*
7. *Quercus Glandulifera* and *Blume.*
8. *Quercus Glauda.*
9. *Quercus Glauca.*
10. Other trees belonging to the Eagaceae group.

DESCRIPTION OF THE PREFERRED EMBODIMENT

The method for treating waste water according to the present invention will be described.

Example (1) First acorns were dried at the room temperature and under the sum beams.

(2) Acornic acid was extracted from the dried acorns by using distilled water.

(3) The extracted acornic acid was filtered.

(4) The acid of Item (3) was called acornic acid.

(5) A heavy metal containing waste water (including low concentration and high concentration) was maintained at pH=8−11.5 by adding $NH_4OH$, $Ca(OH)_2$ and NaOH.

(6) The solution of Item (4) was put into the waste water of Item (5).

(7) $Ca^{2+}$ singly or together with other divalent cations were put into the heavy metal containing waste water by 50 ppm or more.

(8) Then the solution of Item (7) was agitated for several minutes, and then, stopped, so that condensation and precipitation should occur.

(9) Generally the precipitation occurred in a speedy manner, but depending on circumstance, a filtering was carried out.

The waste water treating method according to the present invention can treat not only a low concentration waste water but also a high concentration waste water. Therefore, the method of the present invention will be applied with economy. The treating result of the present invention is as shown in Table 1 below.

TABLE 1

| Heavy metal | Heavy Metal Concentration of Acornic Acid Treated Water (Unit: ppm) | | | | | | | |
|---|---|---|---|---|---|---|---|---|
| | Zn | Cr | Fe | Pb | Cd | Cu | Ni | Hg |
| Raw waste | 2700. 66.7, | 28, 5.8 | 80.2, 39 | 24.4 100, | 9.8, 5.6 | 100, 10 | 22.2 32.6 | 100, 20, 10.28 |
| Effluent water criteria | <5.0 | <2.0 | <10.0 | <1.0 | <0.1 | <3 | — | <0.005 |
| Acornic acid treated water | 1.79, 2, | 0.5, 0.5 | 0.08, 0.01 | 0.1 <0.3, | 0.1, 0.05 | 1, 0.01 | 0.05 1.3 | 1.5, 0.3, 0.25 |

TABLE 2

Characteristics of Waste Water Used in This Invention (Unit: ppm except for pH)

| Type of waste water | pH | TSS | COD | Cd | Pb | Cu | Cr | Hg |
|---|---|---|---|---|---|---|---|---|
| Municipal waste water treatment plant (influent) (Raw waste water) | 7.3 | 2706 | 6900 | 0.1 | 0.14 | 1.19 | 12.5 | 0.21 |
| Municipal waste water treatment plant (effluent) after acornic acid treatment | 7.1 | 50 | 260 | 0.1 | 0.14 | 1.15 | 0.49 | 0.19 |
| Electroplating (influent) (Raw waste water) | 3.4 | 126 | 250 | 0.01 | 0.01 | 0.96 | 27 | 0.28 |
| Electroplating (Effluent) after acornic acid treatment | 9.3 | 62 | 130 | 0.01 | 0.01 | 0.12 | 0.17 | 0.17 |

TABLE 3

Characteristics of Waste Water Used in This Invention (Unit: ppm)

| Type of waste water | Pb | Cr | Cu | Zn |
|---|---|---|---|---|
| Aluminum foil manufacturing plant (raw waste water) | 2.5 | 24 | 89 | 11 |
| After alum treatment | 0.22 | 0.03 | 0.03 | 0.3 |
| After acornic acid treatment | 0.13 | 0.1 | 0.17 | 0.07 |
| Envirormental effluent waste water criteria | <0.2 | <0.5 | <1 | <1 |
| D-Industrial waste (Raw waste water) | 4.8 | 2.3 | 33.7 | 36.5 |
| After alum treatment | 0.06 | 0.04 | 0.66 | G.37 |
| After acornic acid treatment | 0.18 | 0.08 | 0.22 | 0.31 |
| Environmental effluent waste water criteria | <0.2 | <0.5 | <1 | |

What is claimed is:

1. A method for treating a heavy metal containing waste water through utilization of acorns, comprising the steps of:

drying said acorns at room temperature and under sun beams;

extracting acornic acid from said dried acorns by using distilled water;

filtering said extracted acornic acid until the color disappears from said acornic acid;

maintaining a heavy metal containing waste water at a pH in the range of from about 8 to 11.5 by adding a base selected from the group consisting of $NH_4OH$, $Ca(OH)_2$, and NaOH;

adding said filtered acornic acid into said heavy metal containing waste water;

adding $Ca^{++}$ ions alone or with other divalent cations at a combined level of 50 ppm or more;

agitating the solution of heavy metal containing waste water and acornic acid; and one of (i) allowing the heavy metals to be precipitated from the solution, or (ii) filtering the solution, whereby the heavy metal containing waste water is treated.

2. The method as claimed in claim 1, wherein said acorns are obtained from trees belonging to the Eagaceae group consisting of:

Quercus Dentata,
   Quercus Acutissima,
   Quercus Variabilis,
   Quercus Myrsinaefolia,
   Quercus Mongolica,
   Quercus crispula,
   Quercus Glandulifera, Blume,
   Quercus Glauda, and
   Quercus Glauca,

* * * * *